July 23, 1929. W. T. PATTERSON 1,721,872
INSECT DESTROYER
Filed May 3, 1928

Inventor
W. T. Patterson
By Watson E. Coleman
Attorney

Patented July 23, 1929.

1,721,872

UNITED STATES PATENT OFFICE.

WILLIAM THOMAS PATTERSON, OF SARCOXIE, MISSOURI.

INSECT DESTROYER.

Application filed May 3, 1928. Serial No. 274,814.

This invention relates to insect destroyers and it is an object of the invention to provide a device of this kind which may be readily and conveniently supported out in the open to attract and exterminate moths or other pests which are injurious to fruits, berries and the like.

Another object of the invention is to provide a device of this kind employing a burner together with means whereby the flame of such burner is effectively spread and wherein the device is constructed in a manner to permit the light to be visible above the device as well as at the sides thereof.

An additional object of the invention is to provide a device of this kind which in operation serves to produce an abundance of soot to facilitate the destruction of the pests.

The invention consists in the details of construction and in the combination and arrangement of the several parts of my improved insect destroyer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1:
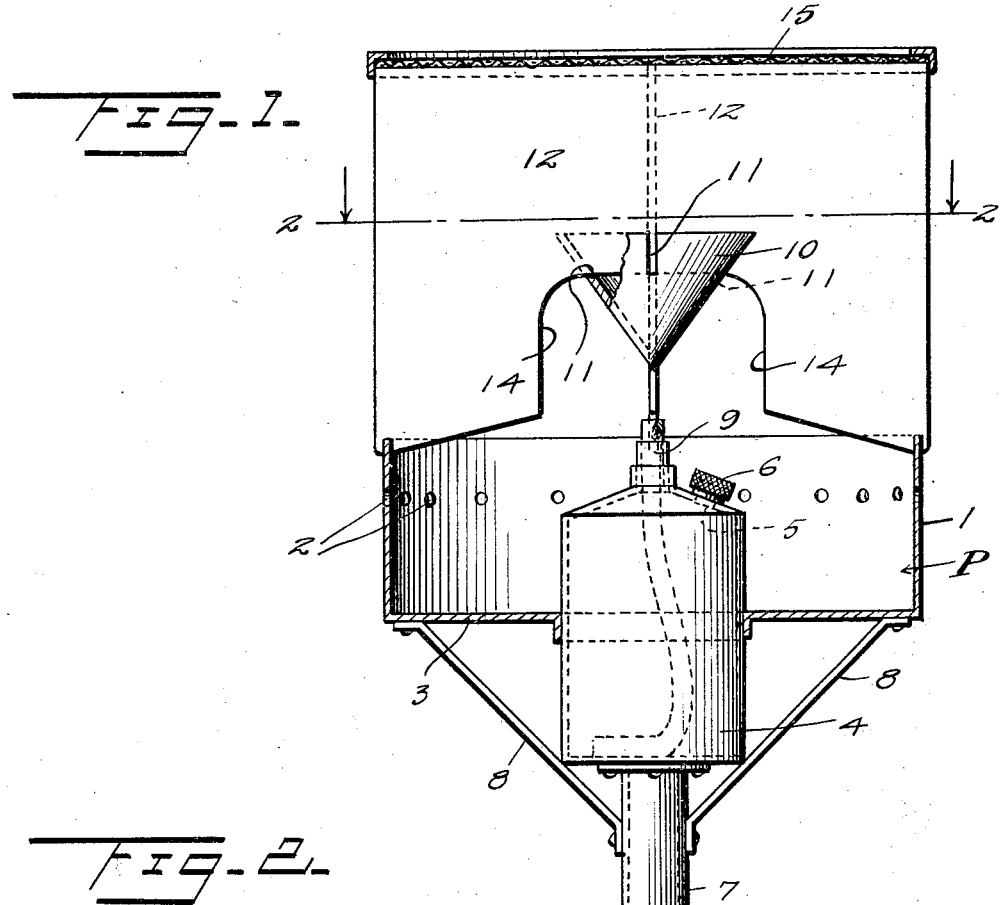
Figure 1 is a view partly in elevation and partly in section illustrating an insect destroyer constructed in accordance with an embodiment of my invention.
Figure 2:
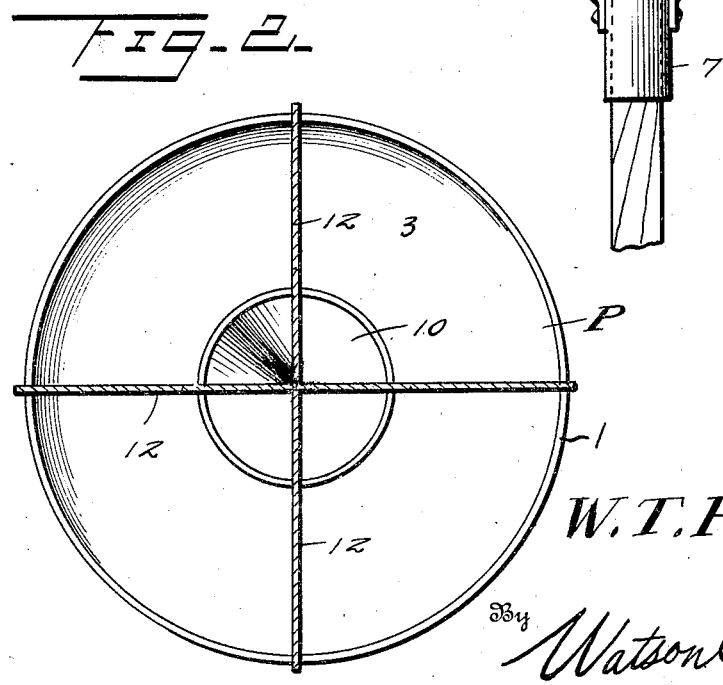
Figure 2 is a sectional view taken substantially on the line 2—2 of Figure 1.

As disclosed in the accompanying drawing, P denotes a pan of requisite dimensions and which is provided in its side wall 1 with a series of perforations 2 spaced a desired distance below the upper edge of said side wall 1 in order to assure the water placed within the pan having a predetermined level therein.

Disposed through the axial center of the bottom wall 3 of the pan P is an oil well 4 of desired capacity and which extends above and below the bottom wall 3. The upper portion of the well 4 is provided with a filling vent 5 normally closed by a cap 6. The bottom of the well 4 at its axial center has depending therefrom a socket 7 adapted to be engaged with the upper end portion of a stack or other desired support whereby the device in its entirety may be readily and conveniently positioned as desired in the open.

Interposed between and suitably connected with the socket member 7 and the bottom wall 3 of the pan P are the bracing members or strips 8.

The upper portion of the well 4 is provided with a burner 9 preferably of a wick type, and so positioned that the flame thereof has direct contact with the inverted conoidal spreader 10. This spreader 10 in its upper portion is provided with slots 11 whereby the device may be effectually engaged with the deflector plates 12.

As herein disclosed, the deflector plates 12 are disposed radially across the pan P and have their lower portions suitably affixed to the upper marginal portion of the side wall of the pan. The plates 12 in their lower portions and above the central part of the pan P are cut away, as at 14, the spreader 10 hereinbefore referred to being operatively engaged with the portions of the plates at the upper parts of said cut away portions 14.

Resting upon and suitably secured to the upper edges of the plates 12 is a perforated plate 15, preferably of wire mesh, said plate 15 being of a diameter to extend to the outer vertical edges of the plates 12.

The well 4 is adapted to hold a supply of low grade oil so that the flame from the burner will produce an abundance of soot wich will be gathered by the plates 12 and thereby assist in the destruction of the moths or other pests as they are stopped by the plates 12. It is to be understood that the plates 12 serve in the character of bumpers for the moths or other pests as attracted by the light and when so stopped the insects will drop upon the water within the pan P.

The plate 15 serves to prevent the insects from escaping upwardly from between the plates 12 and by having this plate 15 perforated or of a wire mesh, the light emitted from the flame of the burner 9 will serve to attract the insects which may be above the applied device.

From the foregoing description it is thought to be obvious that an insect destroyer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An insect destroyer comprising a liquid receptacle having an open top, a burner disposed centrally of said receptacle, a plurality of crossed vertically arranged plates each having its lower edge slotted to receive the top edge of said receptacle, the plates constituting a series of radially arranged fins, and a flame spreader comprising an upright cone secured to the lower edges of said plates across the intersecting portions thereof with the apex directed downwardly and upon the longitudinal center of said burner.

2. An insect destroyer comprising an open liquid receptacle, a burner attached centrally within the receptacle having an upwardly directed wick, a plurality of upright plates each having its lower edge slotted to receive the edge of said receptacle, said plates intersecting one another upon the radial center of the receptacle and each having the central portion of its lower edge cut away, and a flame and smoke spreading cone secured in the cut away portions of the plates with the apex thereof directed downwardly toward said wick.

3. An insect destroyer comprising an open liquid receptacle, a burner attached centrally within the receptacle having an upwardly directed wick, a plurality of upright plates each having its lower edge slotted to receive the edge of said receptacle, said plates intersecting one another upon the radial center of the receptacle and each having the central portion of its lower edge cut away, a flame and smoke spreading cone secured in the cut away portions of the plates with the apex thereof directed downwardly toward said wick, and a foraminous circular body overlying and resting upon the top edges of said plates.

In testimony whereof I hereunto affix my signature.

WILLIAM T. PATTERSON.